United States Patent
Narita et al.

(10) Patent No.: US 10,950,259 B2
(45) Date of Patent: Mar. 16, 2021

(54) MAGNETIC HEAD AND MAGNETIC RECORDING AND REPRODUCING DEVICE

(71) Applicant: KABUSHIKI KAISHA TOSHIBA, Tokyo (JP)

(72) Inventors: Naoyuki Narita, Chiba (JP); Hirofumi Suto, Tokyo (JP); Tomoyuki Maeda, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/914,382

(22) Filed: Jun. 28, 2020

(65) Prior Publication Data
US 2020/0327901 A1    Oct. 15, 2020

Related U.S. Application Data

(62) Division of application No. 16/296,292, filed on Mar. 8, 2019, now Pat. No. 10,734,017.

(30) Foreign Application Priority Data

Aug. 20, 2018   (JP) .............................. JP2018-154101

(51) Int. Cl.
*G11B 5/31*    (2006.01)
*G11B 5/11*    (2006.01)
(Continued)

(52) U.S. Cl.
CPC ................ *G11B 5/315* (2013.01); *G11B 5/02* (2013.01); *G11B 5/11* (2013.01); *G11B 5/1278* (2013.01);
(Continued)

(58) Field of Classification Search
None
See application file for complete search history.

(56) References Cited

U.S. PATENT DOCUMENTS 7,957,098 B2   6/2011   Yamada et al.
8,208,219 B2   6/2012   Zhang et al.
(Continued)

FOREIGN PATENT DOCUMENTS

JP    2014-81981 A    5/2014
JP    2018-147540 A   9/2018
JP    2018-156709 A   10/2018

OTHER PUBLICATIONS

Yakushiji et al., "Very strong antiferromagnetic interlayer exchange coupling with iridium spacer layer for perpendicular magnetic tunnel junctions," Appl. Phys. Lett., 110:092406-1 to 092406-4 (Feb. 28, 2017).

*Primary Examiner* — William J Klimowicz
(74) *Attorney, Agent, or Firm* — Finnegan, Henderson, Farabow, Garrett & Dunner, L.L.P.

(57) ABSTRACT

According to one embodiment, a magnetic head includes a magnetic pole, a first shield, and a stacked body. The stacked body is provided between the magnetic pole and the first shield. The stacked body includes a magnetic layer including at least one selected from the group consisting of Fe, Co, and Ni, a first conductive layer provided between the magnetic pole and the magnetic layer, the first conductive layer being nonmagnetic, and a second conductive layer provided between the magnetic layer and the first shield, the second conductive layer being nonmagnetic. The first conductive layer includes Ir. A thickness of the first conductive layer along a first direction is not less than 0.3 nm and not more than 0.8 nm. The first direction is from the first conductive layer toward the second conductive layer.

4 Claims, 8 Drawing Sheets

(51) Int. Cl.
*G11B 5/66* (2006.01)
*G11B 5/02* (2006.01)
*G11B 5/127* (2006.01)
*G11B 5/187* (2006.01)
*G11B 5/235* (2006.01)
*G11B 5/00* (2006.01)

(52) U.S. Cl.
CPC .............. *G11B 5/187* (2013.01); *G11B 5/235* (2013.01); *G11B 5/314* (2013.01); *G11B 5/3116* (2013.01); *G11B 5/3146* (2013.01); *G11B 5/3153* (2013.01); *G11B 5/3156* (2013.01); *G11B 5/66* (2013.01); *G11B 2005/0024* (2013.01)

(56) References Cited

U.S. PATENT DOCUMENTS

| | | | |
|---|---|---|---|
| 8,274,811 B2 | 9/2012 | Zhang et al. | |
| 8,547,662 B2 | 10/2013 | Yamada et al. | |
| 8,824,104 B1 * | 9/2014 | Koui | G11B 5/235 360/125.3 |
| 8,922,949 B1 * | 12/2014 | Koui | G11B 5/3133 360/125.3 |
| 9,076,463 B2 | 7/2015 | Yamada et al. | |
| 9,218,828 B1 | 12/2015 | Koui et al. | |
| 9,666,216 B1 | 5/2017 | Kobayashi et al. | |
| 10,032,470 B1 | 7/2018 | Degawa et al. | |
| 10,109,302 B1 | 10/2018 | Shinohara et al. | |
| 10,121,497 B1 | 11/2018 | Takahashi et al. | |
| 10,325,618 B1 | 6/2019 | Wu et al. | |
| 2009/0052095 A1 | 2/2009 | Yamada et al. | |
| 2014/0104724 A1 | 4/2014 | Shiroishi et al. | |
| 2019/0066717 A1 | 2/2019 | Ohtake et al. | |
| 2019/0088274 A1 | 3/2019 | Narita et al. | |
| 2019/0088275 A1 | 3/2019 | Narita et al. | |

* cited by examiner

MAGNETIC HEAD AND MAGNETIC RECORDING AND REPRODUCING DEVICE

CROSS-REFERENCE TO RELATED APPLICATIONS

This application is a divisional of U.S. patent application Ser. No. 16/296,292, filed Mar. 8, 2019, which is based upon and claims the benefit of priority from Japanese Patent Application No. 2018-154101, filed on Aug. 20, 2018; the entire contents of which are incorporated herein by reference.

FIELD

Embodiments described herein relate generally to a magnetic head and a magnetic recording and reproducing device.

BACKGROUND

Information is recorded in a magnetic storage medium such as a HDD (Hard Disk Drive) or the like using a magnetic head. It is desirable to increase the recording density of the magnetic head and the magnetic recording and reproducing device.

DETAILED DESCRIPTION

Figure 1A:
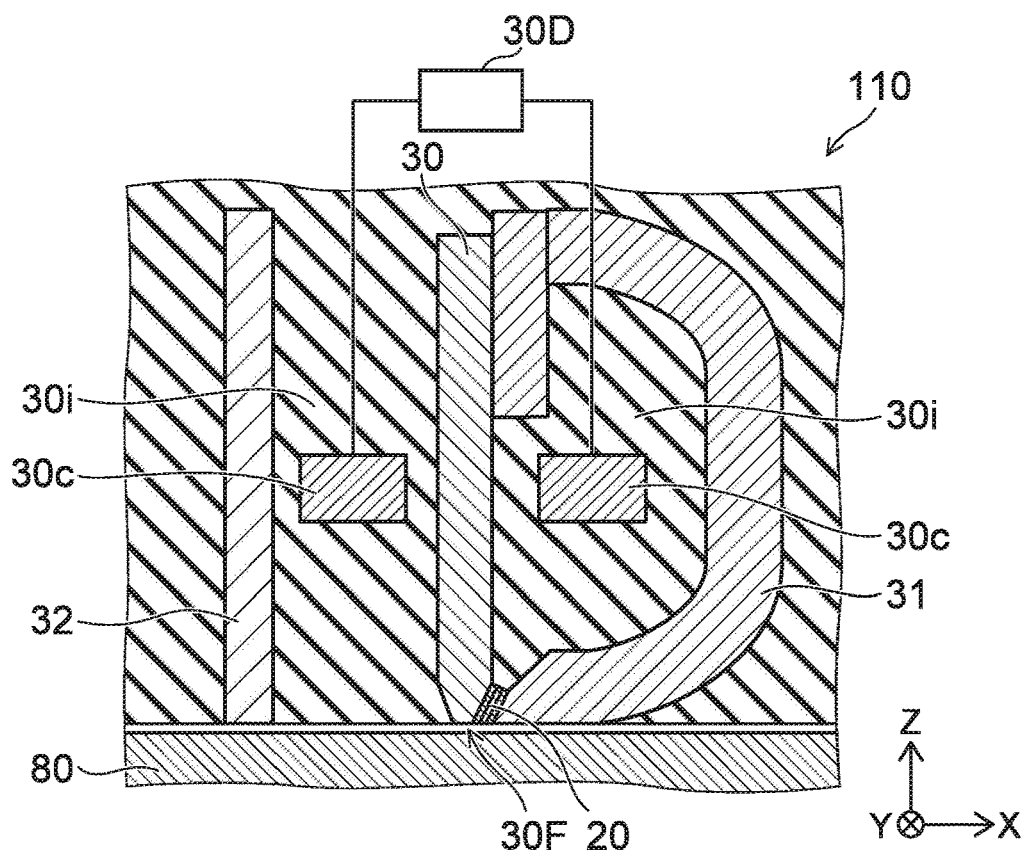
FIG. 1A and FIG. 1B are schematic cross-sectional views illustrating a magnetic head according to a first embodiment.

According to one embodiment, a magnetic head includes a magnetic pole, a first shield, and a stacked body. The stacked body is provided between the magnetic pole and the first shield. The stacked body includes a magnetic layer including at least one selected from the group consisting of Fe, Co, and Ni, a first conductive layer provided between the magnetic pole and the magnetic layer, the first conductive layer being nonmagnetic, and a second conductive layer provided between the magnetic layer and the first shield, the second conductive layer being nonmagnetic. The first conductive layer includes Ir. A thickness of the first conductive layer along a first direction is not less than 0.3 nm and not more than 0.8 nm. The first direction is from the first conductive layer toward the second conductive layer. The second conductive layer includes at least one selected from the group consisting of Cu, Ag, Al, and Au.

According to another embodiment, a magnetic head includes a magnetic pole, a first shield, and a stacked body. The stacked body is provided between the magnetic pole and the first shield. The stacked body includes a magnetic layer including at least one selected from the group consisting of Fe, Co, and Ni, a first conductive layer provided between the magnetic pole and the magnetic layer, and a second conductive layer provided between the magnetic layer and the first shield. The first conductive layer is nonmagnetic. The second conductive layer is nonmagnetic. The first conductive layer includes at least one selected from the group consisting of Cu, Ag, Al, and Au. The second conductive layer includes Ir. A thickness of the second conductive layer along a first direction is not less than 0.3 nm and not more than 0.8 nm. The first direction is from the first conductive layer toward the second conductive layer.

According to another embodiment, a magnetic recording and reproducing device includes the magnetic head according to any one described above, a magnetic recording medium where information is recorded by the magnetic head, and an electrical circuit configured to supply a current to the stacked body.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
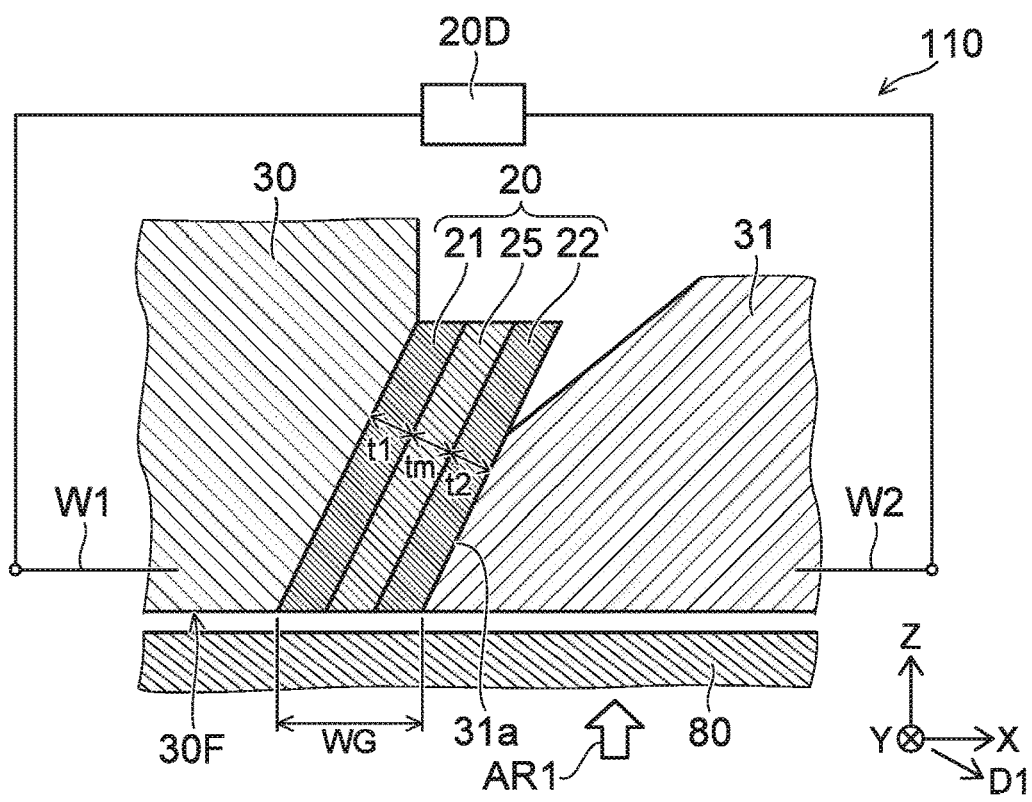

FIG. 1A and FIG. 1B are schematic cross-sectional views illustrating a magnetic head according to a first embodiment.

Figure 2:
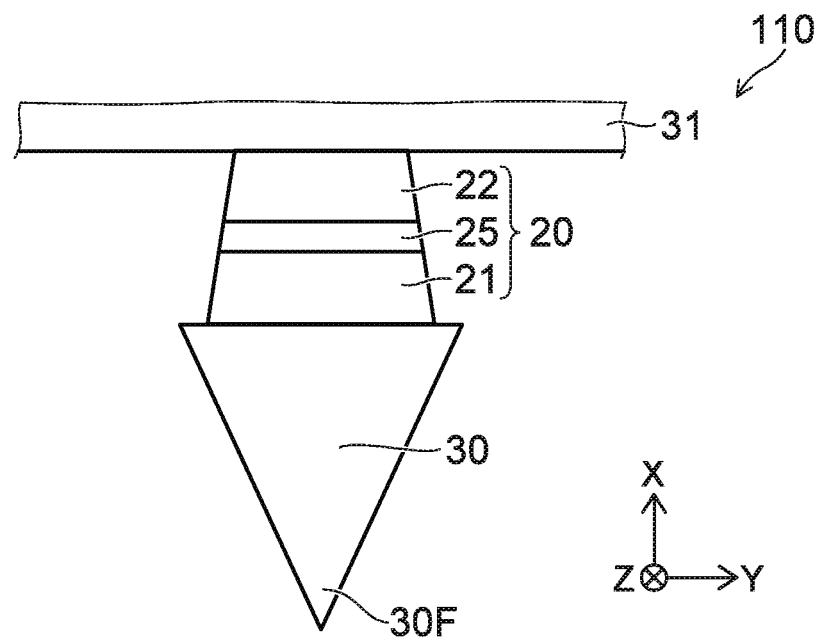
FIG. 2 is a schematic plan view illustrating the magnetic head according to the first embodiment.

FIG. 2 is a schematic plan view illustrating the magnetic head according to the first embodiment.

FIG. 1B is an enlarged view of a portion of FIG. 1A. FIG. 2 is a plan view as viewed along arrow AR1 of FIG. 1B.

As shown in FIG. 1A, the magnetic head 110 according to the embodiment includes a magnetic pole 30, a first shield 31, and a stacked body 20. A second shield 32 and a coil 30c are further provided in the example.

The magnetic pole 30 is provided between the first shield 31 and the second shield 32. At least a portion of the coil 30c is provided between the magnetic pole 30 and the first shield 31. In the example, a portion of the coil 30c is provided between the magnetic pole 30 and the second shield 32.

A recording electrical circuit (a second electrical circuit 30D) is electrically connected to the coil 30c. A recording current is supplied from the recording electrical circuit to the coil 30c. A magnetic field (a recording magnetic field) that corresponds to the recording current is generated from the magnetic pole 30. The recording magnetic field is applied to a magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

The stacked body 20 is provided between the magnetic pole 30 and the first shield 31.

An insulating portion 30i is provided around the magnetic pole 30, the first shield 31, the second shield 32, the coil 30c, and the stacked body 20.

The magnetic pole 30 has a first surface 30F. The first surface 30F is, for example, a medium-opposing surface. The first surface 30F is aligned with an ABS (Air Bearing Surface) of the magnetic head 110. The first surface 30F opposes the magnetic recording medium 80.

A direction perpendicular to the first surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

The first shield 31 is separated from the magnetic pole 30 along the X-axis direction. The X-axis direction is along the first surface 30F.

For example, the first shield 31 is separated from the magnetic pole 30 along the X-axis direction at the vicinity of the first surface 30F. For example, the magnetic pole 30 is separated from the second shield 32 along the X-axis direction at the vicinity of the first surface 30F. For example, a portion of the first shield 31 is separated from a portion of the magnetic pole 30 along the X-axis direction. For example, a portion of the magnetic pole 30 is separated from a portion of the second shield 32 along the X-axis direction. The magnetic head 110 and the magnetic recording medium 80 move relatively substantially along the X-axis direction. Thereby, information is recorded at any position of the magnetic recording medium 80.

The magnetic pole 30 is, for example, a major magnetic pole. The first shield 31 is, for example, an auxiliary magnetic pole. The first shield 31 can form a magnetic core with the magnetic pole 30. For example, an additional shield such as a side shield (not illustrated), etc., may be provided.

As shown in FIG. 1B, the stacked body 20 includes a magnetic layer 25, a first conductive layer 21, and a second conductive layer 22.

The magnetic layer 25 includes at least one selected from the group consisting of Fe, Co, and Ni. The magnetic layer 25 is, for example, an FeCo layer, an FeNi layer, etc.

The first conductive layer 21 is provided between the magnetic pole 30 and the magnetic layer 25. The first conductive layer 21 contacts the magnetic pole 30 and the magnetic layer 25. The first conductive layer 21 is nonmagnetic. The first conductive layer 21 is, for example, a nonmagnetic metal layer.

The second conductive layer 22 is provided between the magnetic layer 25 and the first shield 31. The second conductive layer 22 contacts the magnetic layer 25 and the first shield 31. The second conductive layer 22 is nonmagnetic. The second conductive layer 22 is, for example, a nonmagnetic metal layer.

The thickness of the first conductive layer 21 along the first direction D1 from the first conductive layer 21 toward the second conductive layer 22 is taken as a thickness t1. The thickness of the second conductive layer 22 along the first direction D1 is taken as a thickness t2. The thickness of the magnetic layer 25 along the first direction D1 is taken as a thickness tm. These thicknesses are thicknesses (lengths) along the stacking direction of the stacked body 20. These thicknesses may be thicknesses (lengths) along the direction from the magnetic pole 30 toward the first shield 31.

For example, the first shield 31 has a surface 31a. The surface 31a contacts the second conductive layer 22. The thicknesses recited above correspond to thicknesses (lengths) along a direction perpendicular to the surface 31a.

The thickness tm of the magnetic layer 25 is, for example, not less than 4 nm (nanometers) and not more than 20 nm. The thickness t1 of the first conductive layer 21 is, for example, not less than 0.2 nm and not more than 15 nm. The thickness t2 of the second conductive layer 22 is, for example, not less than 0.2 nm and not more than 15 nm.

As described below, the thicknesses of the conductive layers recited above may be modified according to the materials.

In a first configuration (one example), the first conductive layer 21 includes Ir. In such a case, the thickness t1 of the first conductive layer 21 is not less than 0.3 nm and not more than 0.8 nm. In such a case, the second conductive layer 22 includes at least one selected from the group (a first metal) consisting of Cu, Ag, Al, and Au. In such a case, it is favorable for the thickness t2 of the second conductive layer 22 to be not less than 0.5 nm and not more than 15 nm.

In a second configuration (one other example), the first conductive layer 21 includes at least one selected from the group (the first metal) consisting of Cu, Ag, Al, and Au. In such a case, the second conductive layer 22 includes Ir. In such a case, the thickness t2 of the second conductive layer 22 is not less than 0.3 nm and not more than 0.8 nm. On the other hand, it is favorable for the thickness t1 of the first conductive layer 21 to be not less than 0.5 nm and not more than 15 nm.

As shown in FIG. 1B, for example, a first interconnect W1 and a second interconnect W2 are provided in the magnetic head 110. A current can be supplied to the stacked body 20 by these interconnects.

In the example, the first interconnect W1 is electrically connected to the magnetic pole 30. The second interconnect W2 is electrically connected to the first shield 31. The first interconnect W1 may be electrically connected to the first conductive layer 21. The second interconnect W2 may be electrically connected to the second conductive layer 22. The first interconnect W1 and the second interconnect W2 are electrically connected to a first electrical circuit 20D. The first electrical circuit 20D is configured to supply the current to the stacked body 20.

As described below, it is easy to effectively apply, to the magnetic recording medium 80, the magnetic field (the recording magnetic field) that is generated from the magnetic pole 30 by causing the current to flow in the stacked body 20.

Figure 3:
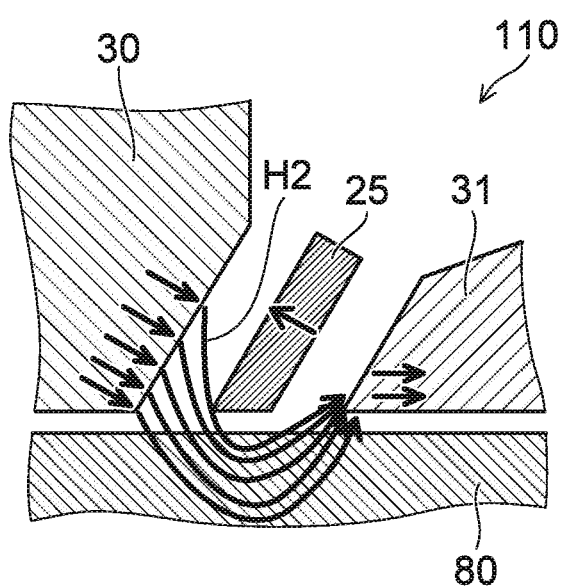
FIG. 3 is a schematic view illustrating an operation of the magnetic head according to the first embodiment.

FIG. 3 is a schematic view illustrating an operation of the magnetic head according to the first embodiment.

A magnetic field from the magnetic pole 30 toward the first shield 31 is generated by causing a recording current to flow in the coil 30c. In a first reference example in which the stacked body 20 is not provided, a portion of the magnetic field emitted from the magnetic pole 30 directly enters the first shield 31 without going toward the magnetic recording medium 80. Therefore, it is difficult to apply the magnetic field to the magnetic recording medium 80. Such a phenomenon is more pronounced when reducing a write gap WG (referring to FIG. 1B) to increase the resolution. On the other hand, in the magnetic head 110 as shown in FIG. 3, by causing a current to flow in the stacked body 20, the magnetization of the magnetic layer 25 has a component in the reverse orientation of the orientation of a magnetic field H2 emitted from the magnetic pole 30. Therefore, the magnetic field H2 that is emitted from the magnetic pole 30 does not pass through the magnetic layer 25 easily. Much of the magnetic field H2 passes through the magnetic recording medium 80 and enters the first shield 31. Therefore, the magnetic field H2 is easily applied to the magnetic recording medium 80. The magnetic field H2 is applied to the magnetic recording medium 80 even in the case where the write gap WG is reduced.

Thus, in the embodiment, even in the case where the write gap WG is reduced, the magnetic field H2 that is emitted from the magnetic pole 30 is suppressed from being oriented directly toward the first shield 31. As a result, much of the magnetic field H2 emitted from the magnetic pole 30 is oriented toward the magnetic recording medium 80; and an effective recording magnetic field is applied to the magnetic recording medium 80. Thereby, the recording density can be increased.

On the other hand, there is a second reference example in which a spin torque oscillator (STO) is provided between the magnetic pole 30 and the first shield 31. The STO includes two magnetic layers, and a nonmagnetic layer provided between the two magnetic layers. A high frequency magnetic field that is generated from the STO is applied to the magnetic recording medium 80; a ferromagnetic resonance phenomenon of the magnetization of the magnetic recording medium 80 is induced; thereby, the recording is easy locally. High frequency assisted writing is performed using this effect.

Conversely, in the embodiment, the stacked body 20 that is provided between the magnetic pole 30 and the first shield 31 includes one magnetic layer 25. In the embodiment, a high frequency magnetic field that is generated from the stacked body 20 is not utilized. In the embodiment, the magnetic field H2 that is emitted from the magnetic pole 30 is oriented toward the magnetic recording medium 80 effectively by utilizing the magnetization of the magnetic layer 25 of the stacked body 20.

In the embodiment, for example, due to the spin torque due to the current flowing through the stacked body 20, the magnetization of the magnetic layer 25 has a component in the reverse orientation of the magnetic field H2 generated from the magnetic pole 30.

Figure 4:
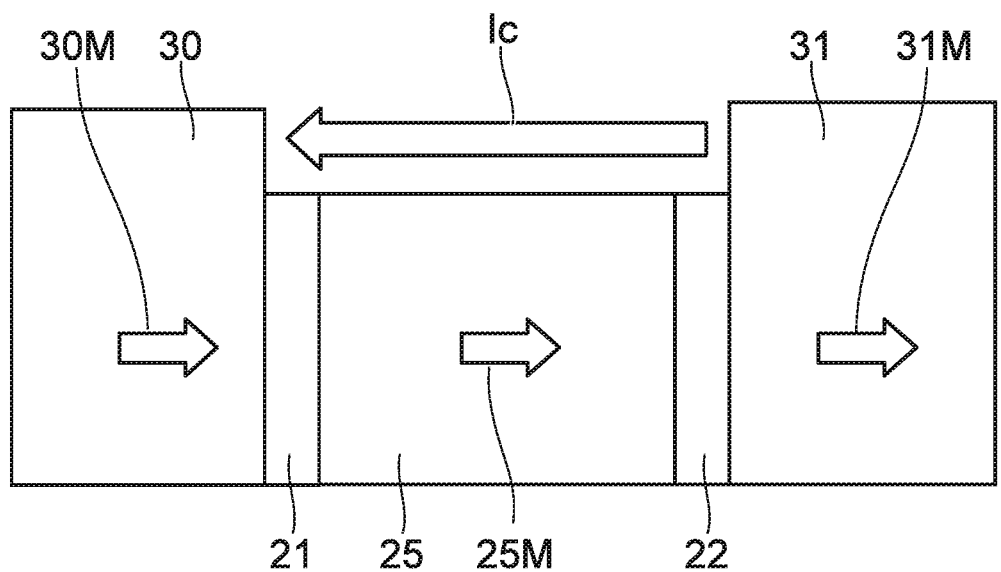
FIG. 4 is a schematic view illustrating an operation of the magnetic head according to the first embodiment.

FIG. 4 is a schematic view illustrating an operation of the magnetic head according to the first embodiment.

The example shown in FIG. 4 corresponds to the first configuration. In such a case, the first conductive layer 21 includes Ir. By appropriately setting the thickness t1 of the first conductive layer 21, the magnetic pole 30 and the magnetic layer 25 are antiferromagnetically coupled easily. On the other hand, the second conductive layer 22 includes, for example, the first metal (e.g., Cu). In such a case, a current Ic flows from the first shield 31 toward the magnetic pole 30. The spin torque at the interface between the first conductive layer 21 and the magnetic layer 25 has a component in the reverse direction of the orientation of the spin torque at the interface between the second conductive layer 22 and the magnetic layer 25. Thereby, the magnetization 25M of the magnetic layer 25 reverses.

For example, the reversal efficiency of the magnetization decreases if spin accumulation occurs at the interface between the first conductive layer 21 and the magnetic layer 25. For example, the spin accumulation can be suppressed by setting the spin diffusion length not to be excessively large.

In the embodiment, the first conductive layer 21 includes Ir; and the thickness t1 of the first conductive layer 21 is not less than 0.3 nm and not more than 0.8 nm. Thereby, the spin accumulation can be suppressed while obtaining the antiferromagnetic coupling between the magnetic pole 30 and the magnetic layer 25. For example, spin relaxation is obtained while obtaining the antiferromagnetic coupling.

For example, the spin diffusion length of Ir is about 0.5 nm. The magnetization 25M of the magnetic layer 25 can be reversed with a practical efficiency when the first conductive layer 21 includes Ir and the thickness t1 of the first conductive layer 21 is not less than 0.3 nm and not more than 0.8 nm.

Figure 5:
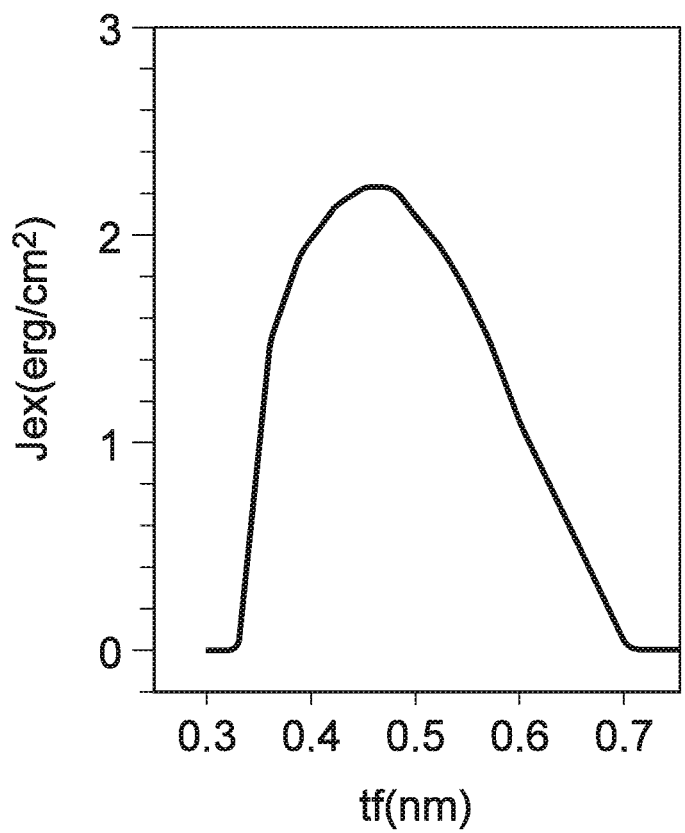
FIG. 5 is a graph illustrating a characteristic of the magnetic layer.

FIG. 5 is a graph illustrating a characteristic of the magnetic layer.

FIG. 5 illustrates an exchange interaction coefficient Jex when the thickness of Ir is changed. The exchange interaction coefficient Jex indicates the magnitude of the antiferromagnetic exchange interaction. The horizontal axis is a thickness tf (nm) of an Ir film. The vertical axis is the exchange interaction coefficient Jex (erg/cm$^2$). It can be seen from FIG. 5 that a high exchange interaction coefficient Jex is obtained in the range where the thickness tf is not less than 0.32 nm and not more than 0.7 nm.

By using such a thickness tf, stable antiferromagnetic coupling is easier to obtain. Thereby, the magnetization 25M of the magnetic layer 25 reverses easily.

There are cases where errors occur when measuring the thickness of a layer. Therefore, in the case where the first conductive layer 21 includes Ir, the thickness t1 may be not less than 0.3 nm and not more than 0.8 nm. The thickness t1 may be not less than 0.32 nm and not more than 0.7 nm. The thickness t1 may be not less than 0.38 nm and not more than 0.56 nm. The thickness t1 may be not less than 0.4 nm and not more than 0.52 nm.

Similarly, in the case where the second conductive layer 22 includes Ir, the thickness t2 may be not less than 0.3 nm and not more than 0.8 nm. The thickness t2 may be not less than 0.32 nm and not more than 0.7 nm. The thickness t2 may be not less than 0.38 nm and not more than 0.56 nm. The thickness t2 may be not less than 0.4 nm and not more than 0.52 nm.

In the embodiment, the electrical resistance between the magnetic pole 30 and the first shield 31 when the first current is caused to flow from the first shield 31 toward the magnetic pole 30 is different from the electrical resistance between the magnetic pole 30 and the first shield 31 when the second current is caused to flow from the magnetic pole 30 toward the first shield 31. For example, the electrical resistance difference corresponds to the orientation difference of the magnetization 25M of the magnetic layer 25. For example, the electrical resistance difference is based on a magnetoresistance effect.

An example of simulation results of a characteristic of the magnetic head will now be described.

Figure 6:
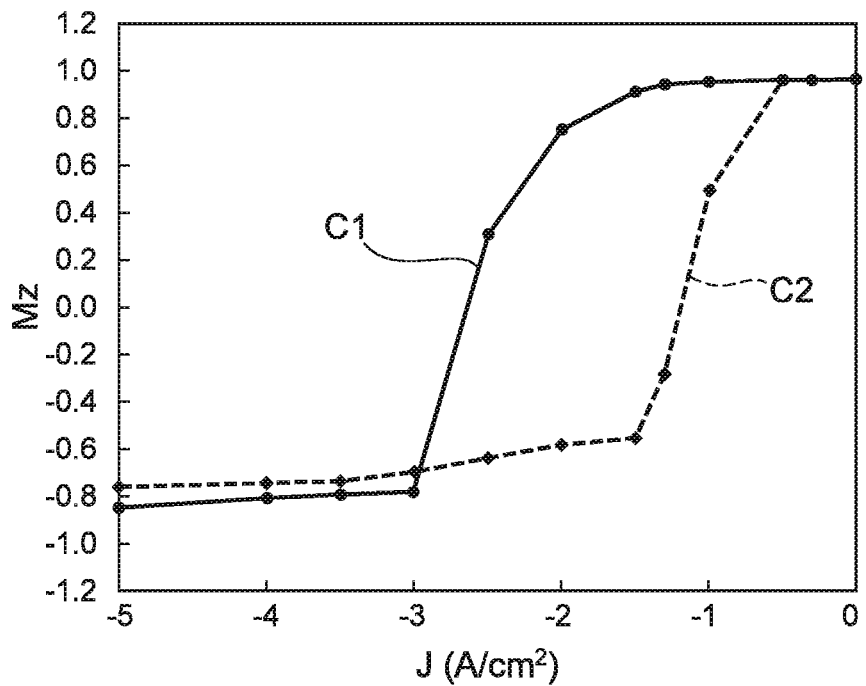
FIG. 6 is a graph illustrating the characteristic of the magnetic head.

FIG. 6 is a graph illustrating the characteristic of the magnetic head.

FIG. 6 shows the magnetization reversal characteristic. The horizontal axis of FIG. 6 is a current density 3 (A/cm$^2$) of the current flowing in the stacked body 20. The vertical axis is a normalized magnetization value Mz relating to the magnetization 25M of the magnetic layer 25. The state in which the normalized magnetization value Mz is positive corresponds to the state in which magnetization reversal of the magnetization 25M of the magnetic layer 25 has not occurred. The state in which the normalized magnetization value Mz is negative corresponds to the state in which magnetization reversal of the magnetization 25M of the magnetic layer 25 has occurred. In the example, it is favorable for the normalized magnetization value Mz to be near −1 when the current density 3 is negative and the absolute value of the current density 3 is large. Thereby, the magnetic field H2 that is emitted from the magnetic pole 30 can be better oriented toward the magnetic recording medium 80.

The characteristics of a first model C1 and a second model C2 are illustrated in FIG. 6. The first model C1 has the following configuration. The first conductive layer 21 is an Ir layer. The thickness t1 of the first conductive layer 21 is 0.5 nm. The thickness tm of the magnetic layer 25 is 10 nm. The saturation magnetization of the magnetic layer 25 is 1 T. The second conductive layer 22 is a Cu layer. The thickness t2 of the second conductive layer 22 is 3 nm.

The second model C2 has the following configuration. The first conductive layer 21 is a Ta layer. The thickness t1 of the first conductive layer 21 is 3 nm. The spin diffusion length of Ta is 2 nm. The configurations of the magnetic layer 25 and the second conductive layer 22 of the second model C2 are the same as the configurations of the magnetic layer 25 and the second conductive layer 22 of the first model C1.

Compared to the second model C2 as shown in FIG. 6, the normalized magnetization value Mz is near −1 for the first model C1 when the current density 3 is negative and the absolute value of the current density 3 is large. A more ideal reverse magnetization state is obtained for the first model C1.

In the embodiment, for example, the first conductive layer 21 includes Ir; and the thickness t1 of the first conductive layer 21 is not less than 0.3 nm and not more than 0.8 nm. According to the embodiment, a recording density that is higher than that of the second model C2 is obtained.

An example of an operation of the magnetic head 110 according to the embodiment will now be described. The following example relates to the first configuration. In the first configuration, the first conductive layer 21 includes Ir; and the second conductive layer 22 includes the first metal (e.g., Cu, etc.).

Figure 7:
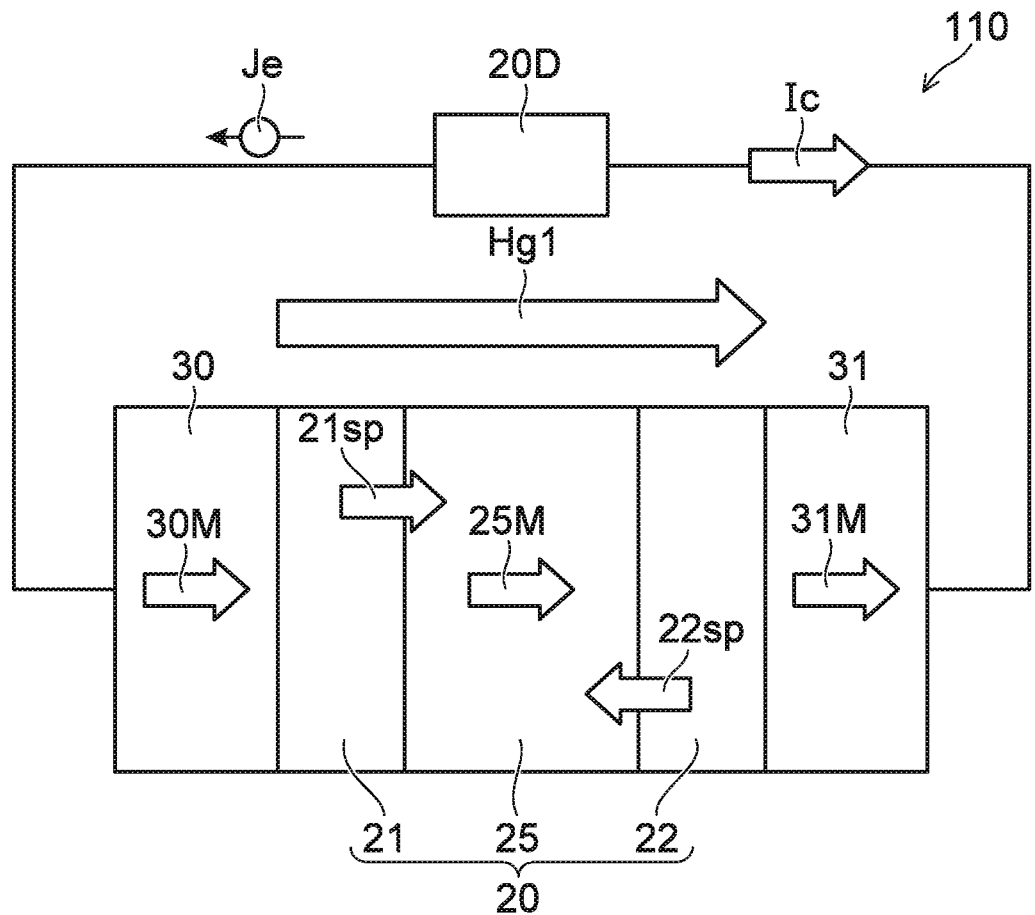
FIG. 7 is a schematic view illustrating the operation of the magnetic head according to the embodiment.

FIG. 7 is a schematic view illustrating the operation of the magnetic head according to the embodiment.

As shown in FIG. 7, the stacked body 20 is provided between the magnetic pole 30 and the first shield 31. The magnetic layer 25, the first conductive layer 21, and the second conductive layer 22 are provided in the stacked body 20.

A recording current is supplied to the coil 30c of the magnetic pole 30 from the second electrical circuit 30D (referring to FIG. 1A). Thereby, a gap magnetic field Hg1 is generated from the magnetic pole 30. The gap magnetic field Hg1 is applied to the stacked body 20.

For example, a magnetization 30M of the magnetic pole 30 and a magnetization 31M of the first shield 31 are substantially parallel to the gap magnetic field Hg1. The magnetization 25M of the magnetic layer 25 is substantially parallel to the gap magnetic field Hg1.

At this time, the current Ic is supplied from the first electrical circuit 20D to the stacked body 20. In the example, the current Ic is supplied to the stacked body 20 via the first shield 31 and the magnetic pole 30. For example, the current Ic flows from the second conductive layer 22 toward the first conductive layer 21. An electron current Je flows at this time. The electron current Je flows from the first conductive layer 21 toward the second conductive layer 22.

Spin torque 21sp is generated at the interface between the first conductive layer 21 and the magnetic layer 25 by the electron current Je. The spin torque 21sp is transmissive. On the other hand, spin torque 22sp is generated at the interface between the magnetic layer 25 and the second conductive layer 22 by the electron current Je. The spin torque 22sp is reflective. The magnetization 25M of the magnetic layer 25 is reversed by these spin torques. The reversed magnetization 25M has a component antiparallel to the gap magnetic field Hg1 shown in FIG. 7.

In the case of the second configuration recited above, for example, the current Ic may flow from the first conductive layer 21 toward the second conductive layer 22. In such a case, the orientation of the spin torque 21sp and the orientation of the spin torque 22sp shown in FIG. 7 are reversed. The spin torque 21sp is reflective; and the spin torque 22sp is transmissive.

In the embodiment, for example, the magnetization 25M of the magnetic layer 25 has the reverse orientation of the magnetic field (the gap magnetic field Hg1) generated from the magnetic pole 30 in the case where the current Ic is not provided in the magnetic layer 25. The magnetic field that is generated from the magnetic pole 30 can be applied effectively to the magnetic recording medium 80 by such a magnetization 25M.

In the embodiment, for example, when the current Ic is caused to flow between the first conductive layer 21 and the second conductive layer 22 (e.g., between the magnetic pole 30 and the first shield 31), the magnetization 25M of the magnetic layer 25 has a component in the reverse direction of the magnetic field (the gap magnetic field Hg1) generated from the magnetic pole 30 in the case where the current Ic is not caused to flow.

Examples of several magnetic heads according to the first embodiment will now be described. Portions that are different from the magnetic head 110 will be described.

Figure 8:
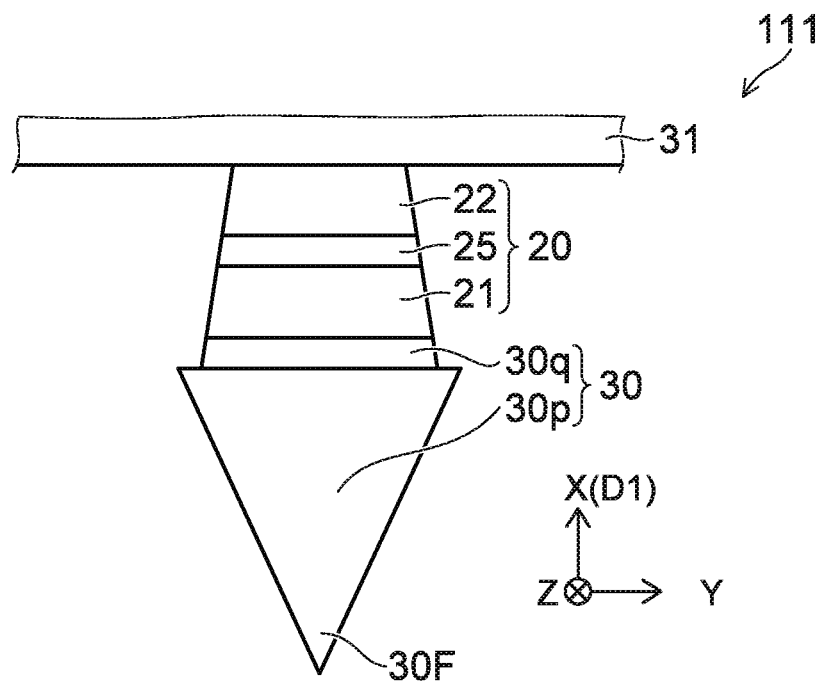
FIG. 8 is a schematic plan view illustrating a magnetic head according to the first embodiment.

FIG. 8 is a schematic plan view illustrating a magnetic head according to the first embodiment.

FIG. 8 corresponds to a plan view as viewed along arrow AR1 of FIG. 1B.

As shown in FIG. 8, the magnetic head 111 according to the embodiment also includes the magnetic pole 30, the first shield 31, and the stacked body 20.

In the magnetic head 111, the first conductive layer 21 is Ir. The second conductive layer 22 includes at least one selected from the group consisting of Cu, Ag, Al, and Au. In such a case, a current having an orientation from the second conductive layer 22 toward the first conductive layer 21 is supplied.

In the magnetic head 111, the magnetic pole 30 includes a magnetic pole portion 30p and a first intermediate layer 30q. The first intermediate layer 30q is provided between the magnetic pole portion 30p and the stacked body 20. The first intermediate layer 30q includes, for example, at least one selected from the group consisting of Fe, Co, and Ni. The magnetic pole portion 30p includes, for example, FeCo.

The first intermediate layer 30q includes, for example, FeNi. The first intermediate layer 30q may function as a seed layer when forming the stacked body 20. The thickness of the first intermediate layer 30q along the first direction D1 (the direction from the first conductive layer 21 toward the second conductive layer 22) is, for example, not less than 0.5 nm and not more than 5 nm.

By providing the first intermediate layer 30q, for example, the spin transfer torque that acts on the magnetic layer 25 can be controlled.

Figure 9:
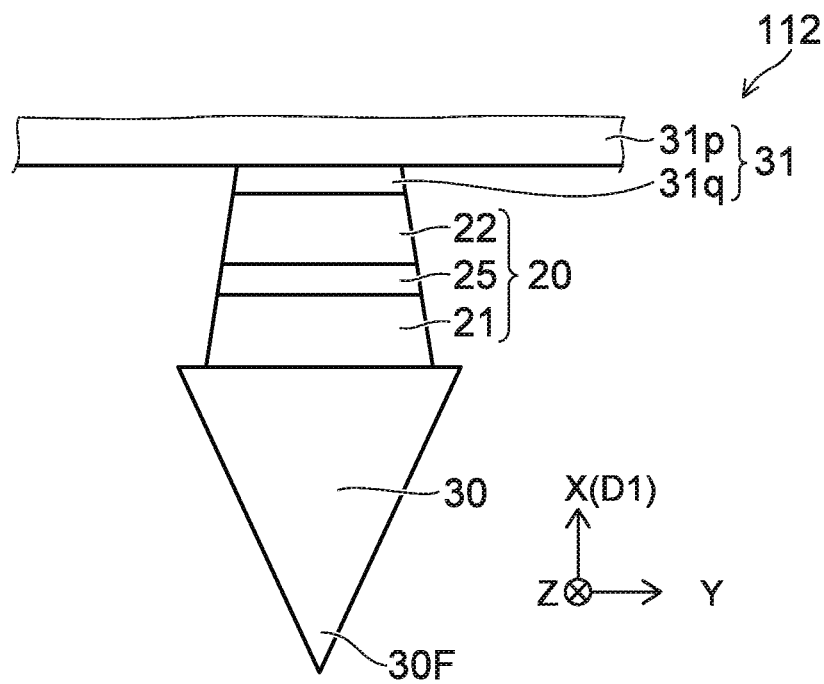
FIG. 9 is a schematic plan view illustrating a magnetic head according to the first embodiment.

FIG. 9 is a schematic plan view illustrating a magnetic head according to the first embodiment.

FIG. 9 corresponds to a plan view as viewed along arrow AR1 of FIG. 1B.

As shown in FIG. 9, the magnetic head 112 according to the embodiment also includes the magnetic pole 30, the first shield 31, and the stacked body 20.

In the magnetic head 112, the first conductive layer 21 includes at least one selected from the group consisting of Cu, Ag, Al, and Au. The second conductive layer 22 includes Ir. In such a case, a current that has an orientation from the first conductive layer 21 toward the second conductive layer 22 is supplied.

In the magnetic head 112, the first shield 31 includes a shield portion 31p and a second intermediate layer 31q. The second intermediate layer 31q is provided between the shield portion 31p and the stacked body 20. The second intermediate layer 31q includes at least one selected from the group consisting of Fe, Co, and Ni. The shield portion 31p includes, for example, FeCo.

The second intermediate layer 31q includes, for example, FeNi. The second intermediate layer 31q may function as a seed layer when forming the stacked body 20. The thickness of the second intermediate layer 31q along the first direction D1 (the direction from the first conductive layer 21 toward the second conductive layer 22) is, for example, not less than 0.5 nm and not more than 5 nm.

By providing the second intermediate layer 31q, for example, the spin transfer torque that acts on the magnetic layer 25 can be controlled.

Figure 10:
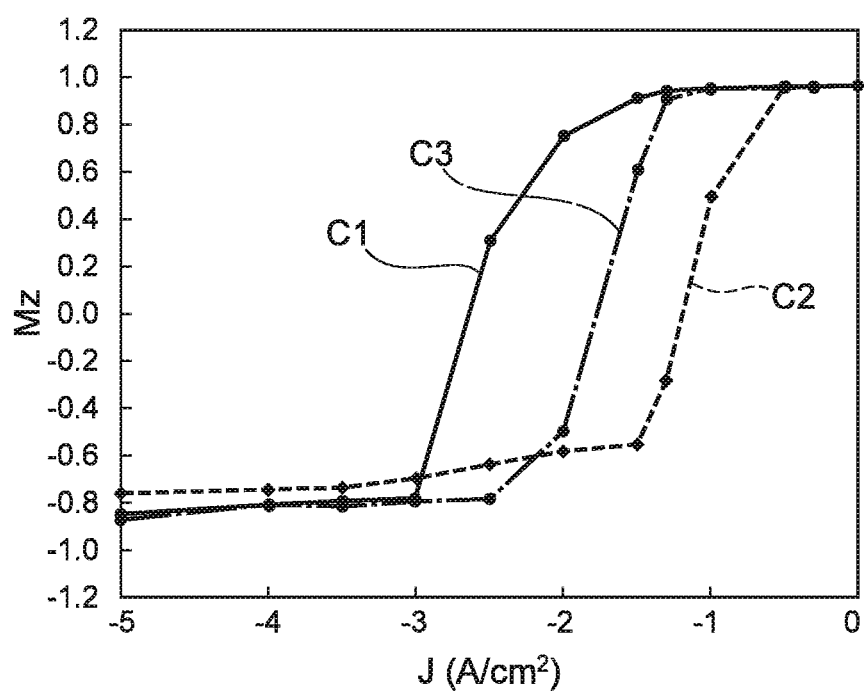
FIG. 10 is a graph illustrating a characteristic of the magnetic head.

FIG. 10 is a graph illustrating a characteristic of the magnetic head.

FIG. 10 shows the magnetization reversal characteristic. The horizontal axis of FIG. 10 is the current density 3 (A/cm$^2$) of the current flowing in the stacked body 20. The vertical axis is the normalized magnetization value Mz relating to the magnetization 25M of the magnetic layer 25. In FIG. 10, the characteristic of a third model C3 is illustrated in addition to the first model C1 and the second model C2 described above. The third model C3 has the configuration of the magnetic head 111 (referring to FIG. 8). In the third model C3, the first intermediate layer 30q is an FeNi alloy layer. The thickness of the first intermediate layer 30q is 3 nm. The spin polarization ratio of the first intermediate layer 30q is 0.3. The first conductive layer 21 is an Ir layer. The thickness t1 of the first conductive layer 21 is 0.5 nm. The thickness tm of the magnetic layer 25 is 10 nm. The saturation magnetization of the magnetic layer 25 is 1 T. The second conductive layer 22 is a Cu layer. The thickness t2 of the second conductive layer 22 is 3 nm.

In the third model C3 as shown in FIG. 10, similarly to the first model C1, the normalized magnetization value Mz is near −1 when the current density 3 is negative and the absolute value of the current density 3 is large. In the third model C3 as well, a more ideal reverse magnetization state is obtained. Compared to the second model C2, a more ideal reverse magnetization state is obtained at a small current density in the third model C3.

An example of a magnetic recording and reproducing device according to the embodiment will now be described.

Figure 11:
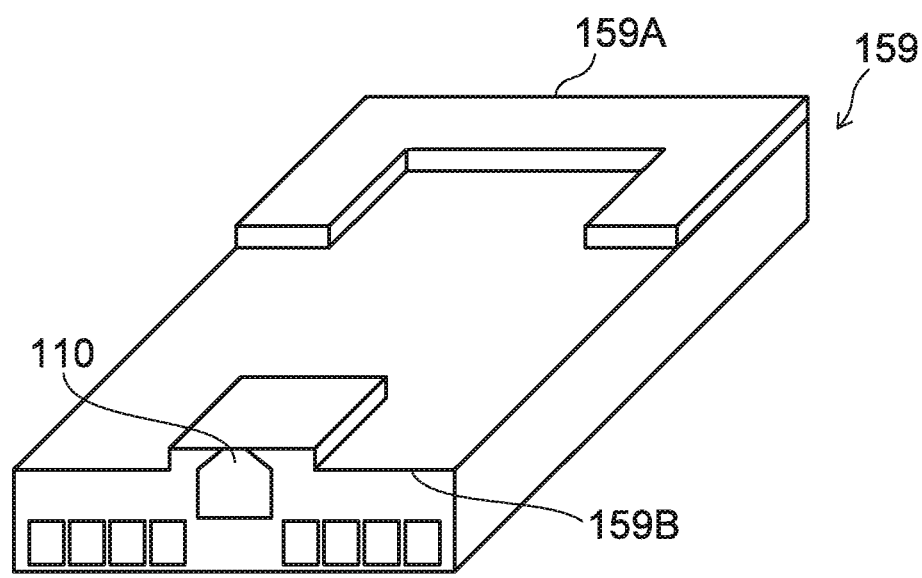
FIG. 11 is a schematic perspective view illustrating a portion of the magnetic recording and reproducing device according to the embodiment.

FIG. 11 is a schematic perspective view illustrating a portion of the magnetic recording and reproducing device according to the embodiment.

FIG. 11 illustrates a head slider.

The head slider 159 is provided in the magnetic head 110. The head slider 159 includes, for example, Al$_2$O$_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 12:
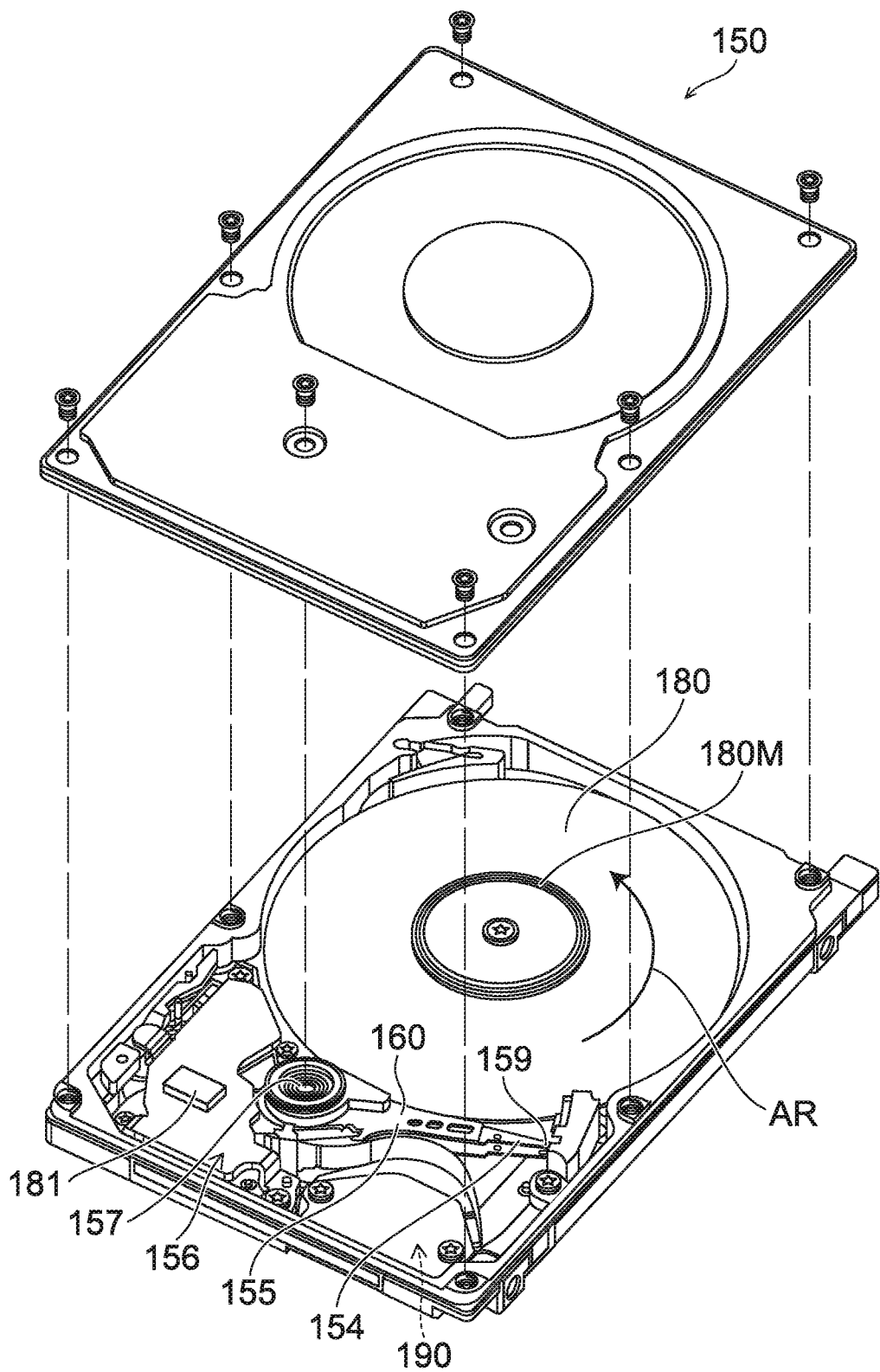
FIG. 12 is a schematic perspective view illustrating the magnetic recording and reproducing device according to the embodiment.

FIG. 12 is a schematic perspective view illustrating the magnetic recording and reproducing device according to the embodiment.

Figure 13A:
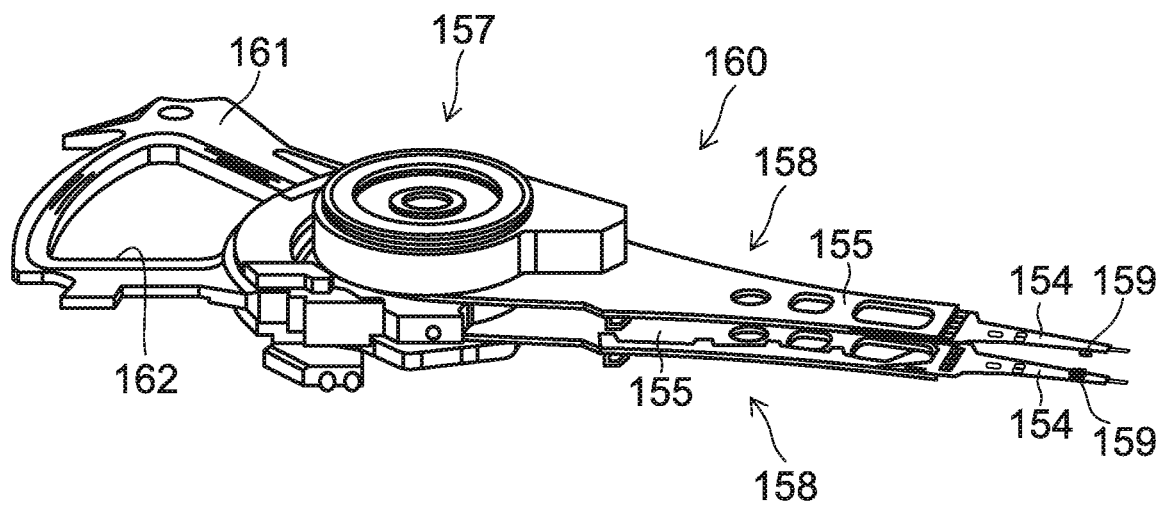
FIG. 13A and FIG. 13B are schematic perspective views illustrating a portion of the magnetic recording and reproducing device according to the embodiment.
Figure 13B:
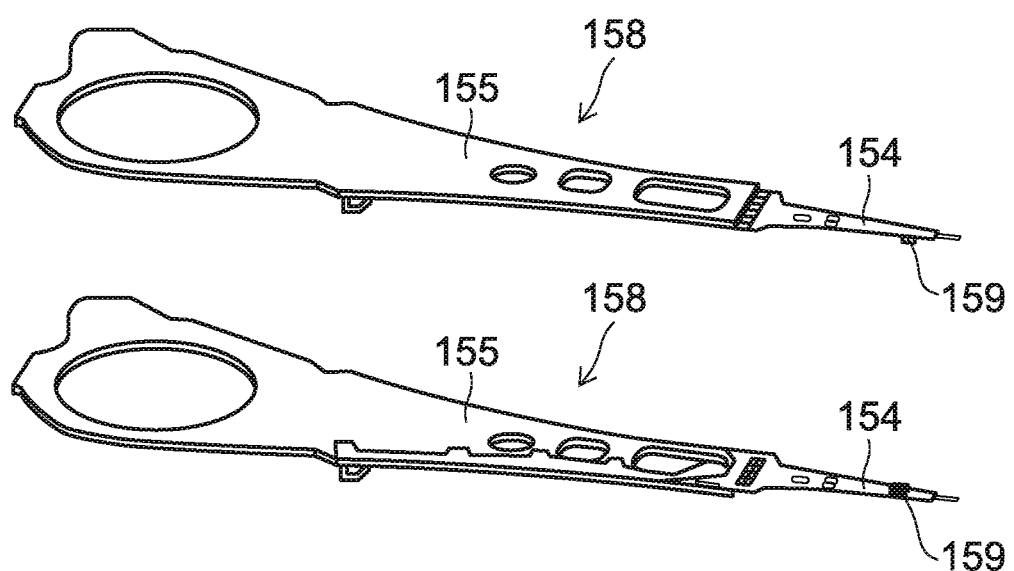

FIG. 13A and FIG. 13B are schematic perspective views illustrating a portion of the magnetic recording and reproducing device according to the embodiment.

As shown in FIG. 12, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 13A illustrates the configuration of a portion of the magnetic recording and reproducing device and is an enlarged perspective view of a head stack assembly 160.

FIG. 13B is a perspective view illustrating a magnetic head assembly (a head gimbal assembly (HGA)) 158 that is a portion of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 13B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) that are for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. In the signal processor 190, for example, the input/output lines of the signal processor 190 are electrically connected to the magnetic head by being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

The embodiments include, for example, the following configurations (e.g., technological proposals).

Configuration 1

A magnetic head, comprising:
a magnetic pole;
a first shield; and
a stacked body provided between the magnetic pole and the first shield,
the stacked body including
a magnetic layer including at least one selected from the group consisting of Fe, Co, and Ni,
a first conductive layer provided between the magnetic pole and the magnetic layer, the first conductive layer being nonmagnetic, and
a second conductive layer provided between the magnetic layer and the first shield, the second conductive layer being nonmagnetic,
the first conductive layer including Ir,
a thickness of the first conductive layer along a first direction being not less than 0.3 nm and not more than 0.8 nm, the first direction being from the first conductive layer toward the second conductive layer,
the second conductive layer including at least one selected from the group consisting of Cu, Ag, Al, and Au.

Configuration 2

The magnetic head according to Configuration 1, wherein a current is conductable in an orientation from the second conductive layer toward the first conductive layer.

Configuration 3

The magnetic head according to Configuration 1 or 2, wherein
the magnetic pole includes:
a magnetic pole portion; and
a first intermediate layer provided between the magnetic pole portion and the stacked body, and
the first intermediate layer includes at least one selected from the group consisting of Fe, Co, and Ni.

Configuration 4

The magnetic head according to Configuration 1 or 2, wherein the first intermediate layer includes FeNi.

Configuration 5

The magnetic head according to Configuration 3 or 4, wherein the first intermediate layer contacts the magnetic pole portion.

Configuration 6

The magnetic head according to any one of Configurations 3 to 5, wherein a thickness of the first intermediate layer along the first direction is not less than 0.5 nm and not more than 5 nm.

Configuration 7

A magnetic head, comprising:
a magnetic pole;
a first shield; and
a stacked body provided between the magnetic pole and the first shield,
the stacked body including
a magnetic layer including at least one selected from the group consisting of Fe, Co, and Ni,
a first conductive layer provided between the magnetic pole and the magnetic layer, the first conductive layer being nonmagnetic, and
a second conductive layer provided between the magnetic layer and the first shield, the second conductive layer being nonmagnetic, the first conductive layer including at least one selected from the group consisting of Cu, Ag, Al, and Au,
the second conductive layer including Ir,
a thickness of the second conductive layer along a first direction being not less than 0.3 nm and not more than 0.8 nm, the first direction being from the first conductive layer toward the second conductive layer.
Configuration 8
The magnetic head according to Configuration 7, wherein a current is conductable in an orientation from the first conductive layer toward the second conductive layer.
Configuration 9
The magnetic head according to Configuration 7 or 8, wherein
the first shield includes:
a shield portion; and
a second intermediate layer provided between the shield portion and the stacked body, and
the second intermediate layer includes at least one selected from the group consisting of Fe, Co, and Ni.
Configuration 10
The magnetic head according to Configuration 7 or 8, wherein the second intermediate layer includes FeNi.
Configuration 11
The magnetic head according to Configuration 9 or 10, wherein the second intermediate layer contacts the shield portion.
Configuration 12
The magnetic head according to any one of Configurations 9 to 11, wherein a thickness of the second intermediate layer along the first direction is not less than 0.5 nm and not more than 5 nm.
Configuration 13
The magnetic head according to Configuration 1 or 7, wherein an electrical resistance between the magnetic pole and the first shield when a first current is caused to flow from the first shield toward the magnetic pole is different from an electrical resistance between the magnetic pole and the first shield when a second current is caused to flow from the magnetic pole toward the first shield.
Configuration 14
The magnetic head according to any one of Configurations 1 to 13, wherein
the first conductive layer contacts the magnetic pole and the magnetic layer, and
the second conductive layer contacts the magnetic layer and the first shield.
Configuration 15
A magnetic recording and reproducing device, comprising:
the magnetic head according to any one of Configurations 1 to 14;
a magnetic recording medium where information is recorded by the magnetic head; and
an electrical circuit configured to supply a current to the stacked body.

According to the embodiments, a magnetic head and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a magnetic pole;
a first shield; and
a stacked body provided between the magnetic pole and the first shield,
the stacked body including
a magnetic layer including at least one selected from the group consisting of Fe, Co, and Ni,
a first conductive layer provided between the magnetic pole and the magnetic layer, the first conductive layer being nonmagnetic, and
a second conductive layer provided between the magnetic layer and the first shield, the second conductive layer being nonmagnetic,
the first conductive layer including Ir,
a thickness of the first conductive layer along a first direction being not less than 0.3 nm and not more than 0.8 nm, the first direction being from the first conductive layer toward the second conductive layer,
the second conductive layer including at least one selected from the group consisting of Cu, Ag, Al, and Au,
wherein the magnetic pole includes:
a magnetic pole portion; and
a first intermediate layer provided between the magnetic pole portion and the stacked body, and
the first intermediate layer includes at least one selected from the group consisting of Fe, Co, and Ni.

2. The head according to claim 1, wherein the first intermediate layer includes FeNi.

3. The head according to claim 1, wherein the first intermediate layer contacts the magnetic pole portion.

4. The head according to claim 1, wherein a thickness of the first intermediate layer along the first direction is not less than 0.5 nm and not more than 5 nm.

\* \* \* \* \*